United States Patent
Bredemeier

[11] 3,710,798
[45] Jan. 16, 1973

[54] LASER SYSTEM FOR MICROSURGERY
[75] Inventor: Herbert C. Bredemeier, Sherborn, Mass. 01770
[73] Assignee: American Optical Corporation, Southbridge, Mass.
[22] Filed: Aug. 30, 1971
[21] Appl. No.: 176,175

[52] U.S. Cl. .................................128/303.1, 128/395
[51] Int. Cl. ..................................................A61n 3/00
[58] Field of Search ................128/303.1, 395–398; 331/94.5

[56] References Cited

UNITED STATES PATENTS

| | | | |
|---|---|---|---|
| 3,348,547 | 10/1967 | Kavanagh | 128/395 |
| 3,481,340 | 12/1969 | McKnight et al. | 128/395 |
| 3,487,835 | 1/1970 | Koester et al. | 128/303.1 |
| 3,642,007 | 2/1972 | Roberts et al. | 128/395 |

Primary Examiner—Lawrence W. Trapp
Attorney—William C. Nealon

[57] ABSTRACT

A beam of infrared energy from a $CO_2$ laser operating in its lowest order spatial mode is passed through a converging lens and directed to an operating site by a mirror or beam splitter. In order to locate the invisible focused spot of infrared energy a beam of visible light from a He-Ne laser is introduced coaxially into the path of the $CO_2$ laser beam by a removable mirror. In another embodiment the He-Ne beam is passed through a beam splitter to form two parallel channels focused by microscope objectives on the input ends of respective fiber optic light guides. A rotating chopper disc is positioned in front of the light guides to alternately block and pass light in each channel. The other ends of the light guides are connected to marker projectors located above the beam splitter for the $CO_2$ beam, but just out of the field of view of an overhead operating microscope. A lens and mirror system in each projector focuses the visible light through the beam splitter onto the focal point of the $CO_2$ beam at the operating site. If the intended site is above or below the $CO_2$ beam focal point, spaced red dots alternating at the frequency of the chopper disc will appear to the viewer through the microscope, indicating the need for further adjustment. Perfect adjustment is indicated by a single non-flashing dot.

30 Claims, 10 Drawing Figures

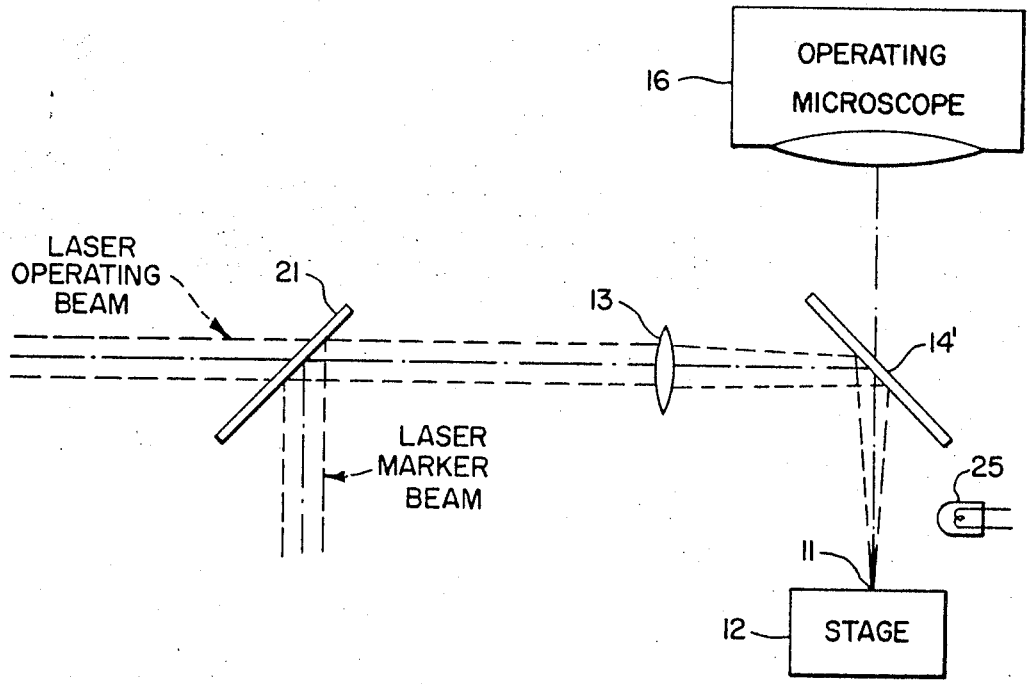
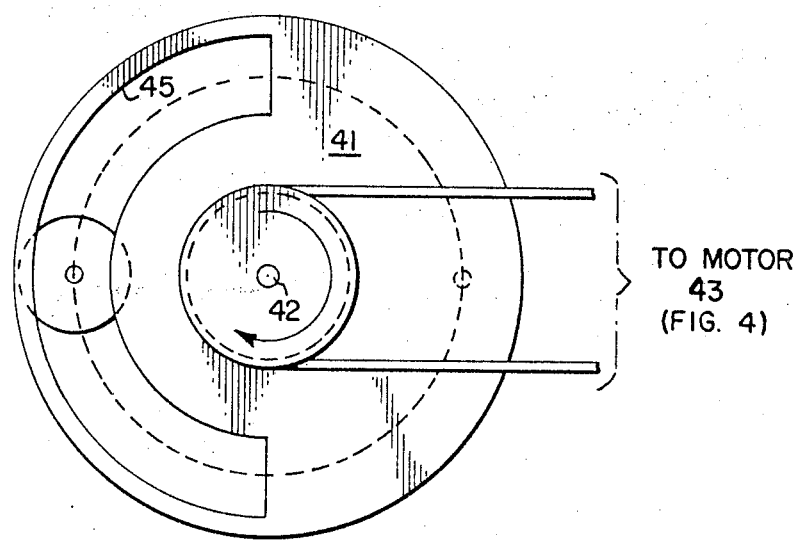

INVENTOR
HERBERT C. BREDEMEIER

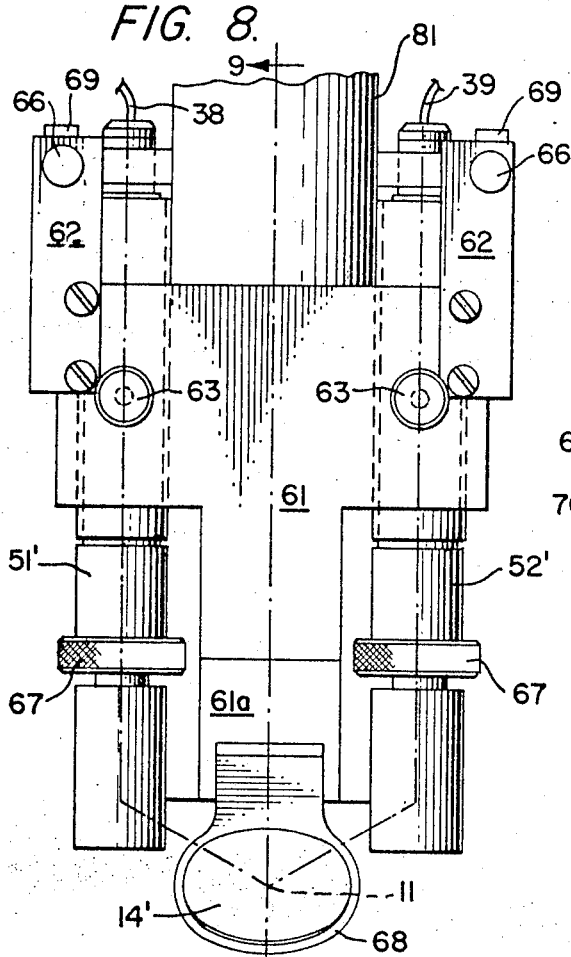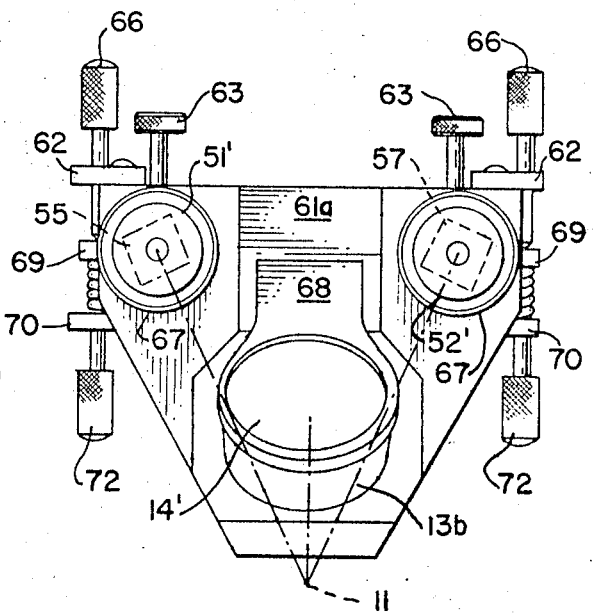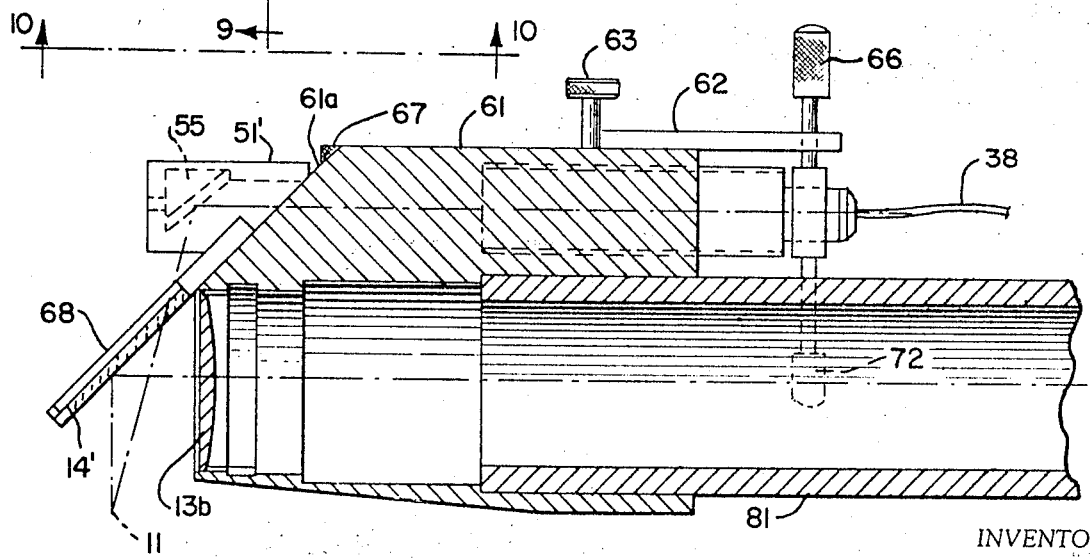

LASER SYSTEM FOR MICROSURGERY

BACKGROUND OF THE INVENTION

The invention relates generally to the fields of microsurgery and laser optical tools and more particularly to improved microsurgical systems for generating a highly localized spot of infrared energy and means for predicting and following the location of the spot.

In the search for smaller and more precisely controllable cutting tools for performing surgery at microscopic dimensions, the laser has been investigated and is now used clinically for certain delicate operations. In U.S. Pat. Nos. 3,084,694 and 3,348,547 to Kavanaugh et al., both assigned to the assignee of this application, photocoagulating apparatus is disclosed for directing a focused beam of intense light on the eye to fuse the detached retina to the choroid. One of the problems treated by both of the patents is the need for precise location of the point of incidence of the focused energy before applying the light at maximum intensity. In the earlier patent, in which an arc lamp is used as the light source, the point of impact is selected by passing the beam from the light source through a removable disc having pin holes which allow attenuated pencil-like beams to pass through the converging optical system. The beams are of insufficient intensity to burn the retina and indicate proper vertical alignment, or focus, when all of the pencil-like beams are superimposed on the same spot. In the later-issued patent, where a ruby laser is the preferred operating light source, an incandescent bulb is used as a separate aiming light source. A beam of light from the bulb is introduced along the normal optical path of the ruby laser and is converged by the optical system to form a low intensity spot of light approximately coincident with the focal point of the laser beam.

In contrast to the special case of eye surgery where it is essential for the light beam to be transmitted through a portion of the eye, it is preferable in other types of surgery, such as experimental operations on bone tissues of the inner ear, for the light beam to be completely absorbed by the tissue on which it is incident. If, however, a highly absorbable infrared beam is employed, its point of impact will not be known until after the tissue is visibly damaged. Therefore, it is essential that some means be provided for marking the location of the focal point of the invisible operating beam during, as well as before the application of maximum power. For accurate definition, the marking spot should be almost as small as the operating beam spot. As smaller operating beam focused spots are obtained, prior art aiming or marking systems, relying, for example, on incandescent sources, become severely limited in brightness and focused spot size.

Another area of concentration in basic microsurgical research has been in selecting among the many available laser materials the optimum laser source with respect to power, tissue absorption, focused spot size and other parameters. Many researchers have turned to the popular Q-switched high power lasers, typically employing ruby or neodymium as the laser medium. But, with these lasers it was found that the disruptive effect on tissues was not localized and in some cases viable cells were expelled from the region of impact to other locations. Some researchers attribute these effects to sonic waves created by the short pulses of extremely high energy.

SUMMARY OF THE INVENTION

Accordingly, one of the objects of the invention is to identify the location of a focused beam of light energy at an operating site. Another object of the invention is to generate a beam of intense infrared radiant energy, highly absorbable by biological tissues, which can be focused to a predetermined point at an operating site viewed directly by an operating microscope. A further object of the invention is to indicate whether the infrared beam is in proper focus at the operating site. Still another object of the invention is to provide a means of gauging the beam power while locating the predetermined focal point of the operating beam.

The applicant has discovered that these and other objects of the invention are accomplished by employing a carbon dioxide ($CO_2$) gas laser, operating in the lowest order $TEM_{00}$ spatial mode, to produce the beam of radiant energy, termed the operating beam, for burning or vaporizing tissue or other objects. The 10.6 micron, infrared wavelength of light emitted has been found to be almost completely absorbed by biological tissues. While the lowest order spatial mode sacrifices power, it permits the beam to be focused to a microscopic spot less than 100 microns in diameter, small enough to selectively damage formerly inaccessible miniscule components of the inner ear of a test animal for experimentation. After passing through a converging lens system, the operating beam is reflected by a final mirror to the desired point of impact or operating site. A microscope is located at a distance directly above the operating site for viewing the progress of the surgery. The final mirror can be located outside of the field of view of the microscope so that the operating beam is directed to the site at an angle relative to the optical axis of the microscope; or the mirror may be replaced by a beam splitter centered obliquely on the optical axis of the microscope so that the site is viewed through the beam splitter and a portion of the operating beam is reflected downwardly along the central optical axis of the microscope. To locate the focused operating beam spot in a rough manner, a mechanical pointer can be rigidly mounted. For more precise location, a helium-neon (He-Ne) laser provides a marker beam of visible light focused to a spot coincident with the focal point of the operating beam. Thus, while the infrared operating beam is completely invisible even during maximum power application, the marker beam continues to indicate the precise location of the applied energy.

In one embodiment, a removable mirror routes the He-Ne marker beam coaxially with the operating beam through the lens system and mirror so that it converges coincidentally with the operating beam. The marker beam mirror may be a beam splitter for continuous operation or may be shutter operated. The marker beam mirror may be arranged in the path of the operating beam such that the operating beam is simultaneously reflected to a power meter whenever the marker beam is introduced into the system.

In another embodiment, the He-Ne marker beam is introduced non-coaxially with the operating beam. A fiber optic illuminating unit first divides the collimated He-Ne beam into two equal intensity parallel channels. The beam in each channel is focused by a suitable lens system, such as a microscope objective, on the input end of a respective fiber optic light guide. Between the lens systems and light guides, a rotating chopper disc having a 180° continuous slot alternately blocks and passes focused light to the light guides. The output ends of the light guides are connected to marker projectors having separate converging optical systems which direct the focused marker beams in each channel toward the focal point of the operating beam, predetermined by preliminary test burns. The operating beam is directed to the operating site through another converging lens system and an obliquely oriented beam splitter centered on the optical axis of an overhead operating microscope so that the operating beam is directed downwardly along the optical axis of the microscope. Since only a fraction of the energy in the $CO_2$ operating beam is ordinarily required and because the marker beam is not reflected by the beam splitter, fused silica or other highly transmissive materials (weakly reflective for infrared rays) can be used for the beam splitter, affording maximum light for the microscope. The marker projectors are located vertically between the beam and the operating microscope, but just out of the microscope's field of view such that the two converging marker beams are directed to the operating site at an angle and just outside of the beam splitter without interfering with either the microscopic view or the operating beam. Improper positioning of the operating site above or below the $CO_2$ focal point (vertically along the microscope's optical axis), causes the oblique marker beams to be non-coincident on the site and to appear as spaced, alternating bright dots of red light to alert the operator. Perfect axial adjustment of the site occurs when the two foci of the marker beam are perfectly superimposed in a single continuous red dot marking the focal point of the operating beam.

BRIEF DESCRIPTION OF THE DRAWINGS

FIG. 2 is a block and schematic diagram illustrating another embodiment of the invention wherein the marker beam is introduced coaxially with the $CO_2$ laser operating beam.

FIG. 5 is a schematic representation in plan view of the chopper disc of FIG. 4.

FIG. 8 is a plan view of the marker projectors and beam splitter of the invention constructed according to FIGS. 3 and 6.

FIG. 9 is a cross-sectional view taken along the lines 9—9 of FIG. 8 illustrating in particular the angular orientation of the beam splitter.

FIG. 10 is a front view taken along lines 10—10 of FIG. 8.

DESCRIPTION OF THE PREFERRED EMBODIMENTS

Figure 1:
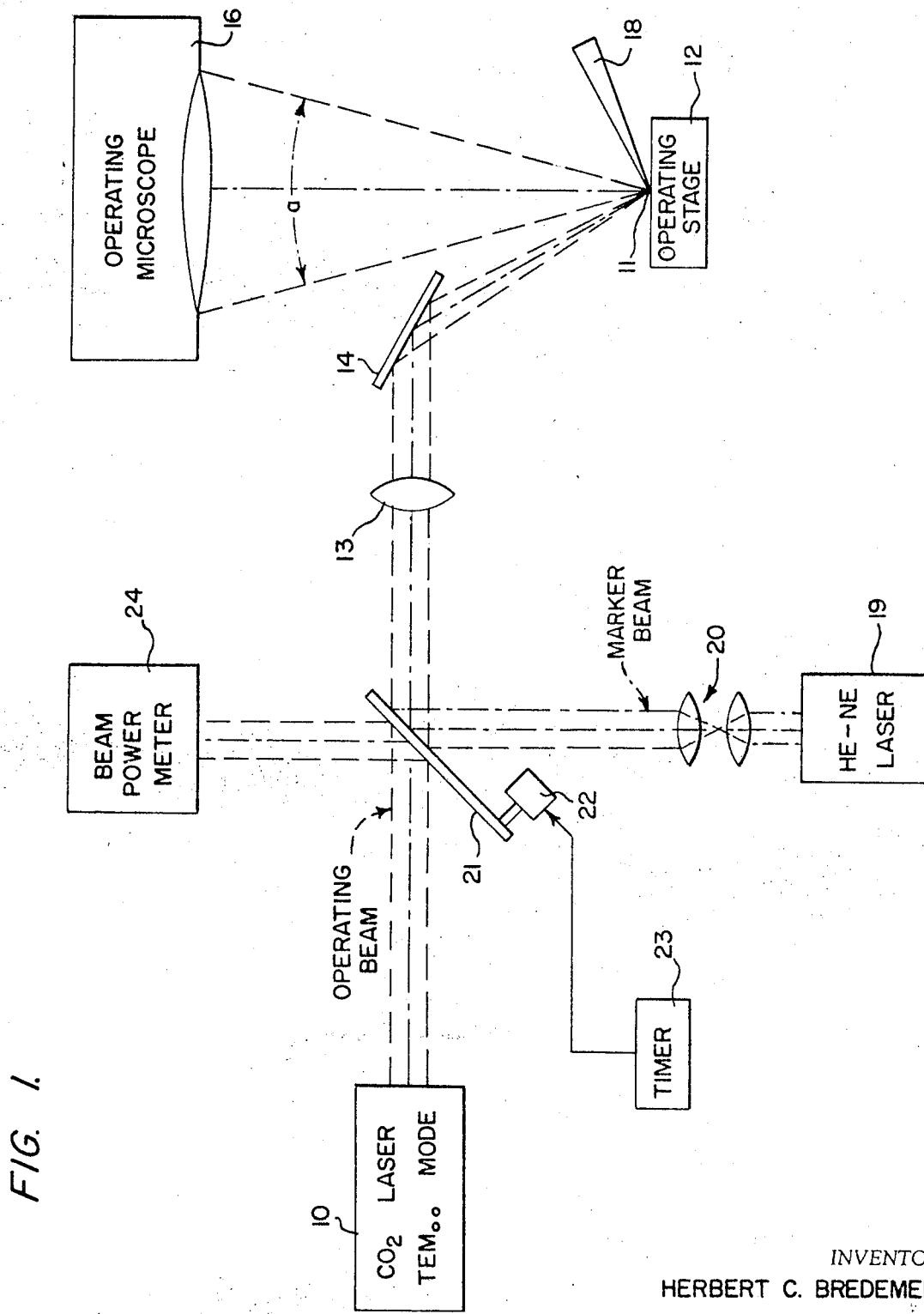
FIG. 1 is a block and schematic diagram illustrating a laser system for microsurgery wherein an He-Ne laser marker beam is introduced coaxially with the $CO_2$ laser operating beam.

Referring now to FIG. 1 of the drawings, a $CO_2$ laser 10 operating in the lowest order $TEM_{00}$ spatial mode produces a coherent infrared beam of light at the wavelength 10.6 microns. Light of this wavelength is invisible and almost completely absorbed by most biological tissues. In addition, the $CO_2$ laser is preferred since its output, either in continuous or pulsed mode, can be controlled continuously from zero to maximum. The radial power distribution perpendicular to the beam axis determines the smallest spot size to which the laser beam can be focused by an optical system. When the laser operates in its lowest order spatial mode the power distribution is represented by a gaussian function and it is possible, while reducing total beam power, to focus the laser radiation to a spot size having the dimensions approximating the wavelength.

The $CO_2$ laser operating beam is directed toward the target site 11 at the operating stage 12 by means of a short focus converging lens 13 of relatively large numerical aperture, followed by a fully reflective final mirror 14. An operating microscope 16 which may be of the conventional stereo type is arranged directly over the target site 11. To avoid interference with the microscope's view, mirror 14 is positioned outside of the angular region $\alpha$ determined by the effective width of the microscope aperture and the distance from the target site.

One means of providing the viewer with a rough indication of the location of the focused operating beam on stage 12 is indicated schematically by pointer 18 representing a mechanical structure rigidly connected to the operating laser optical system to locate the invisible focused spot.

A more accurate means of indicating the spot location is provided by He-Ne laser 19 emitting a beam of visible red light. The beam from laser 19, designated as the marker beam, is reflected by means of a shutter operated, removable mirror 21 along the path of the operating beam to a focal point coincident with the $CO_2$ beam focal point. To insure that the marker and operating beams are coincidentally focused, an auxiliary lens system is interposed between laser 19 and mirror 21 to compensate for difference in the degree of collimation and chromatic inaccuracies of lens 13. A shutter mechanism 22 controlled by a timer 23 brings mirror 21 into and out of the path of the operating beam. The side of mirror 21 which faces the $CO_2$ laser 10 can also be made reflective to deflect the operating beam to a power meter 24. Thus, each time the marker beam is introduced, the power of the operating beam can be sampled. When mirror 21 is out of the way of both beams, it is possible for meter 24 to test the power in the marker beam, if desired. Timer 23 can be implemented to remove mirror 21 from the operating beam path for predetermined intervals to apply a controlled dosage of radiation to the target site.

Referring now to FIG. 2, another arrangement for using laser operating and marker beams is shown, in which the final mirror 14 of FIG. 1 is replaced by a beam splitter 14' directing the coaxial beams to the operating site 11. Because the beam splitter is partially transmissive, it can be centered on the optical axis of the microscope without totally obstructing the view of the work area. A suitable beam splitter 14' is obtained by depositing a thin layer of gold on the front surface of a quartz substrate. The resulting beam splitter deflects about 50 percent of the operating beam energy while transmitting about 20 percent of the visible energy from the operating site to the microscope. An incandescent light source 25 is added between the beam splitter and the operating stage so that the target site may be illuminated for viewing by a microscope which does not have an internal light source.

Figure 3:
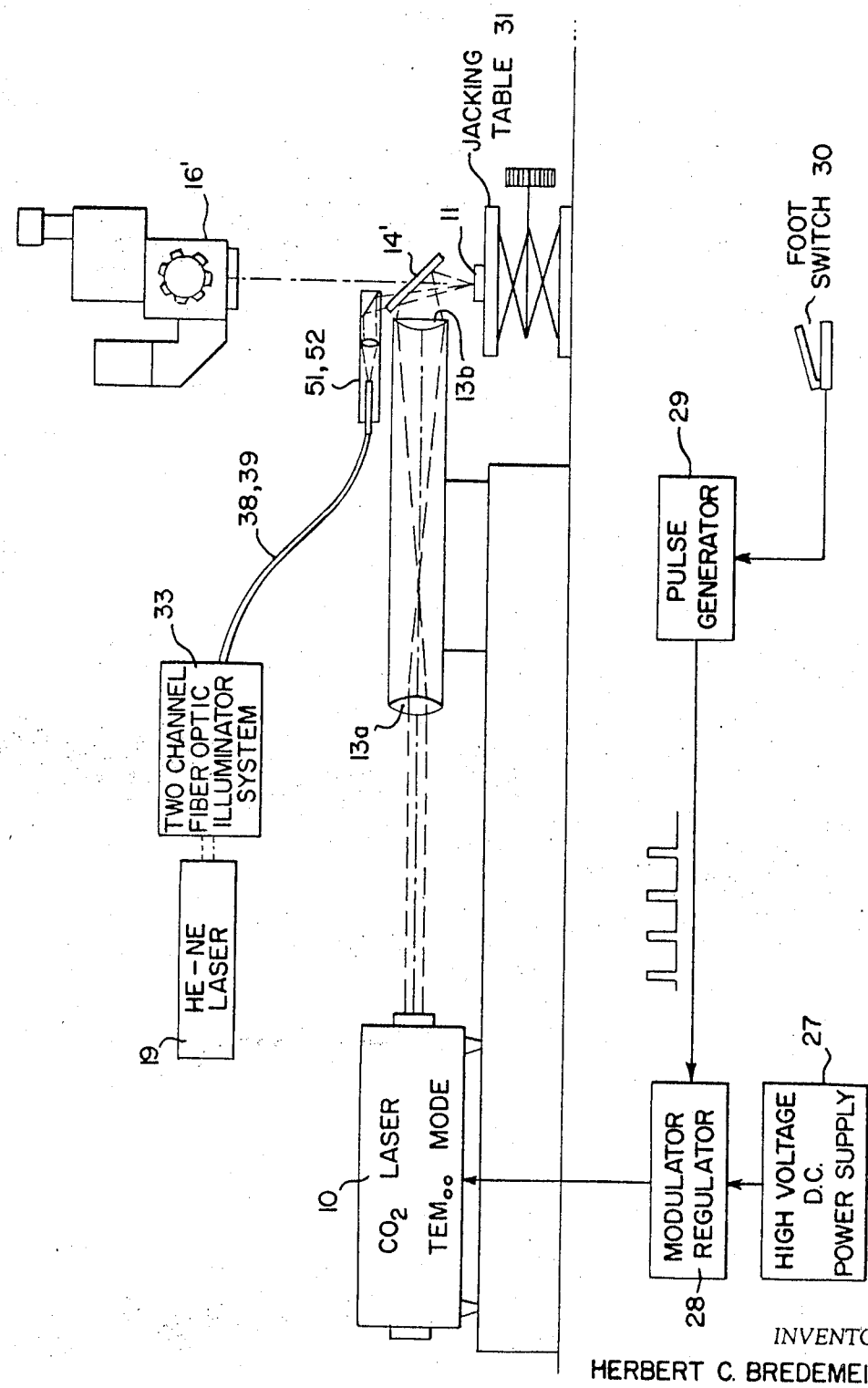
FIG. 3 is a block and schematic diagram illustrating another embodiment of the invention in which a two channel marker beam is introduced non-coaxially with the $CO_2$ operating beam and outside a beam splitter which reflects the operating beam to the operating site.

In the system shown in FIG. 3, laser 10 comprises a $CO_2$ laser unit providing a 10.6 micron beam in the lowest order $TEM_{00}$ spatial mode, as in FIG. 1. For certain types of delicate microsurgery, required, for example, in ear research, $CO_2$ laser 10 would typically have a 50 cm. cavity providing a beam power of from 5 to 10 watts. Power for laser pumping is furnished by a high voltage DC power supply 27 whose output is applied to the laser discharge tube (not shown) via a modulator regulator unit 28. When activated by a foot switch 30, pulse generator 29 causes modulator regulator 28 to apply high voltage pulses to laser 10. Each time a high voltage pulse is applied to the laser, the laser emits a pulse of infrared energy. For a series of applied high voltage pulses, the laser output is a corresponding series of energy pulses at the same repetition frequency and duty cycle as that of the pulse generator. The pulse generator can be implemented to continue producing pulses as long as the foot switch is depressed. A plurality of discrete pulses is preferred over a single pulse of long duration since the brief interval between pulses gives the surgeon greater control and greater ability to assess the progress of the surgery during application of the beam. A predetermined, fixed dosage of energy can be applied by programming the pulse generator to produce a fixed number of pulses each time the foot switch is activated. For example, the pulse generator might provide a train of five 10 millisecond pulses, with a one-half second interval between each pulse, for each activation of the foot switch.

The lens 13 of FIG. 1 is replaced by a pair of lenses 13a and 13b producing a converging beam. In contrast to lens 13 (FIG. 1) which must be of a material transparent to visible as well as infrared wavelengths (e.g. zinc sulphide or sodium chloride), lenses 13a and 13b of FIG. 3 do not have to be transparent to visible light. Therefore a material such as germanium, which is transparent only to infrared rays can be used for lenses 13a and 13b.

The operating laser beam, after passing through lenses 13a and 13b, is reflected perpendicularly downwardly by beam splitter 14'. An operating microscope 16', such as a conventional stereo operating microscope having an internal light source, is located vertically directly above the operating site 11 which in this case represents a biological tissue sample or suitable subject mounted on a jacking table 31 for vertical positioning of the operating site 11. Thus, the axis of the reflected operating beam and the microscope's optical axis are coincident below beam splitter 14'.

In the preferred embodiment of FIG. 3 the He-Ne laser marker beam is introduced non-coaxially with the $CO_2$ operating laser beam. Instead of being reflected from beam splitter 14', the marker beam, as will be seen, is transmitted outside the beam splitter to the operating site. Because only a small portion of the available laser beam energy is required ordinarily for biological tissue destruction and because the marker beam is transmitted rather than reflected by the beam splitter, the beam splitter can be made of a material which will be more transmissive than reflective to permit more of the light energy from the operating site to be viewed by the microscope. A suitable material for beam splitter 14' in FIG. 3 is fused silica which absorbs 90 percent of the infrared laser beam and reflects 10 percent downwardly toward the operating site. The absorbed laser energy is dissipated as heat. Nearly 90 percent of the visible light from site 11 is transmitted through beam splitter 14 to the microscope.

Figure 4:
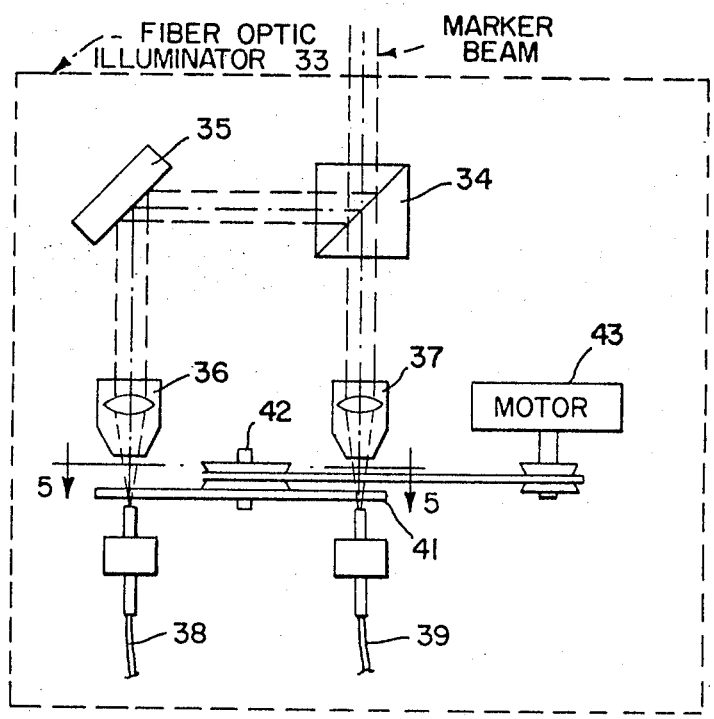
FIG. 4 is a schematic diagram illustrating the two channel fiber optic illuminator system of FIG. 3 in more detail.

As shown in FIG. 3, the marker beam from He-Ne laser 19 is passed to a two channel fiber optic illuminator system 33, the details of which are shown in FIG. 4. First, the marker beam enters a 50/50 beam splitter 34 which divides the marker beam into two perpendicular beams of equal power. Beam splitter 34 may comprise, as shown schematically in FIG. 4, a pair of right angle prisms, each having its hypotenuse face coated with a semi-reflective coating of a material such as aluminum. The two prisms are cemented together at their respective hypotenuse faces and oriented so that the common hypotenuse face makes a 45° angle with the axis of the incoming marker beam. The deflected output beam of beam splitter 34 is reflected by a 45° mirror 35 so as to be parallel with the undeflected beam output of beam splitter 34. The two parallel He-Ne laser beams are next passed through respective converging lens systems 36 and 37 which typically comprise identical 10 power microscope objectives. The input ends of fiber optic light guides 38 and 39 are optically aligned at a distance from converging lens systems 36 and 37 approximately at their focal points. Light guides 38 and 39 each contain a single fiber (not shown) that typically has a diameter of about 50 microns. In the two spaces between the lens systems 36 and 37 and light guides 38 and 39 respectively, a single chopper disc 41 is mounted for rotation about axle 42, centered between lens systems 36 and 37, by means of a motor 43. Disc 41, as shown in FIG. 5, is made of a suitable opaque material and has a transparent slotted portion 45 covering 180° of arc. When the slotted portion is between one of the lens systems 36 or 37 and light guides 38 or 39, the corresponding beam is allowed to pass to the light guide. Thus, the laser beam input is alternately fed to light guides 38 and 39 as chopper disc 41 rotates. A typical speed for the 180° slotted disc 41 is about 5 Hertz. Other forms of chopper discs are possible besides that shown in FIG. 5. It is preferred, however, that one beam be blocked while the other is transmitted.

Figure 6:
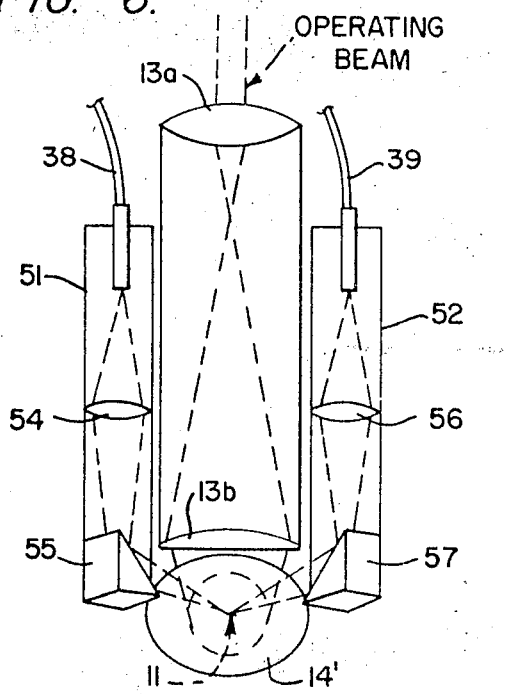
FIG. 6 is a schematic representation illustrating a top view of the marker projectors and beam splitter of FIG. 3.

As shown in FIG. 3, the alternating two channel light output from fiber optic illuminator system 33 is carried by means of parallel light guides 38 and 39 to marker projectors 51 and 52 which refocus and direct the marker beams through beam splitter 14' to the operating site. The marker projectors shown in more detail in FIG. 6, receive the output ends of light guides 38 and 39. The light guides effectively transfer the focal points of lens systems 36 and 37 in illuminator system 33 to the output ends in the marker projectors. The light guide output ends act in effect as point sources of the laser radiation. Marker projector 51 has a lens 54 and a mirror 55 in optical alignment with the end of light guide 38. A suitable mirror 55 is formed by coating the hypotenuse face of a prism with a totally reflective substance. Similarly, projector 52 comprises a lens 56 and a mirror 57 in alignment with the end of light guide 39. Lenses 54 and 56 are preferably identical, short focus converging lenses. Mirrors 55 and 57 deflect the beam in either channel downwardly at an oblique angle to the operating site outside of beam splitter 14'.

Figure 7:
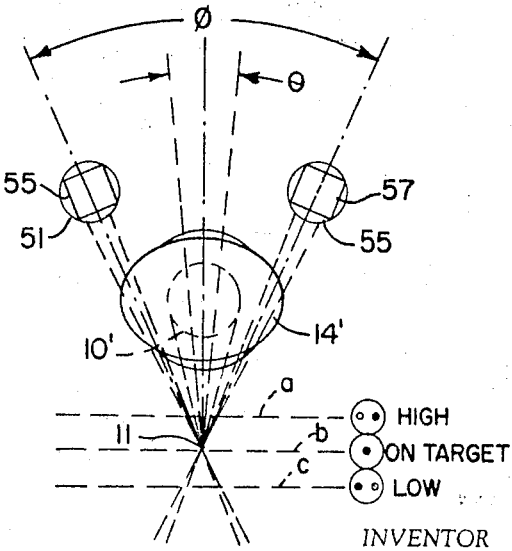
FIG. 7 is a schematic representation illustrating the relative angles of incidence of the optical beams of FIG. 3 and further illustrating the appearance of the marker dots for different vertical positions of the operating site.

As shown in FIG. 7, corresponding to a side view in FIG. 3 directed at beam splitter 14' from the right hand side of the paper, the angle $\theta$, represents the numerical aperture of the operating binocular microscope. The angle $\phi$ represents the angle made by the optical axes of the converging marker beams from beam projectors 51 and 52. It has been found that for maximum sensitivity of focus adjustment, the angle $\phi$ of the marker beams should be greater than the angle $\theta$ of the stereo microscope. The angular separation $\phi$ is limited by the sensitivity or degree of fine vertical adjustment of the jacking table or operating stage.

The operation of the marker system can best be understood by considering three different vertical levels of the operating site 11. The object of the marker system, of course, is to indicate when the operating site is located vertically and horizontally at the focal point of the converging operating beam represented by lines 10'. For example, when the operating site is lifted to the level $a$, the area viewed through the operating microscope will have two alternating spaced dots of red light. If the operating site is lowered to the level $c$ beneath the focal point, the spaced, alternating dots will again appear, although reversed in phase. When the level of the operating site is properly located at level $b$, the two dots will coincide and since one dot is on in effect when the other is off, the single coincident dot will appear to be continuous. If the angular separation $\phi$ is too great, the dots will be in the field of view only over a limited vertical interval and initial rough location will be more difficult. By proper adjustment and pre-alignment the focal points of all three beams, that is the $CO_2$ and He-Ne marker beams, can be made to coincide in a single point. Accordingly, the location of the invisible operating beam can be monitored by the visible red dots of the marker system.

A typical implementation of the marker projectors, beam splitter and the final optics of the operating laser beam, is shown in FIG. 8, 9 and 10. The assembly is held together as a unit by means of a frame 61 which forms a unitary support for the two marker projectors, the beam splitter 14', and for an operating beam tube 81 which has lenses 13b and 13a at opposite ends. Beam splitter 14', outside of which the marker beam is transmitted and from which the operating beam is reflected is held by a beam splitter holder member 68 which is secured to oblique face 61a at the front end of frame 61. Tubular assemblies 51' and 52' for the marker projectors are located respectively on either side of frame 61 above the beam splitter, parallel to each other as well as to the axis of the operating beam tube 81. The tubular projector assemblies receive the output ends of fiber optic light guides 38 and 39 and contain lenses 54 and 56 (not shown in FIGS. 8–10) and mirrors 55 and 57 respectively. An adjustment ring 67 is provided on each projector assembly 51' and 52' to move the outer ends carrying the mirrors back and forth in an axial telescoping fashion. Ring 67 does not change the angular orientation of the mirrors, however. Each projector assembly has an outwardly extending flange 69 connected to its outer periphery. A plate 62 connected to frame 61 holds an upper adjustment screw 66 for each projector assembly. Another plate 70 on frame 61, opposite plate 62, holds a lower adjustment screw 72. Opposing adjustment screws 66 and 72 contact the corresponding projector assembly flange 69 on opposite sides. A spring may be included about the shaft of screw 72 between plates 70 and 69 to force the flange against the end of screw 66 as it is loosened. By rotating upper screw 66, projector assembly 51' can be made to rotate about its longitudinal axis to orient prism mirror 55. Screw 72 would then be screwed up to the new location of flange 69 to lock the tube assembly 51', and prevent further rotation. To insure locked longitudinal and rotational stability, a set screw 63 is threaded through frame 61 to engage the projector assembly.

Proper alignment and preadjustment of the system is essential to the usefulness of the marker system. In operation, the operating $CO_2$ beam is first activated on a sample test site. The focal point of the operating beam is located experimentally by allowing the beam to burn successively smaller spots in the sample surface by varying the distance of the operating site from the center of the beam splitter until the smallest possible burn spot is obtained, indicating that the operating site is located precisely at the focal point of the optical system provided by lenses 13a and 13b (FIG. 3). Next, one of the marker beam projectors would be adjusted to focus the corresponding marker beam coincidentally with the sample burn spot. The distance of the operating site from the lens contained in projector assembly 51', for example, can be varied over a small range by loosening set screw 63 and sliding the entire projector assembly longitudinally inwardly or outwardly with respect to frame 61, and thereafter manipulating ring 67 to extend or withdraw the end of the projector assembly to position the mirror axially with respect to prism 14'. The correct angular orientation of the mirror is obtained by means of screws 66 and 72. Next, the focal point of the other marker beam channel from tube assembly 52' would be made to coincide with the already coincident focal points of the operating beam and the previously adjusted marker beam. With the set screws and adjustment screws firmly holding tubes 51' and 52', the assembly is now in operating condition and the focal point of the $CO_2$ infrared beam will be correctly designated by the coincident focal points of the two alternating marker beams.

It should be understood that while the disclosed laser systems were developed to be of particular use in surgery on biological tissues, especially in ear surgery, other corresponding applications in various industrial fields are possible. Microscopically precise cutting, drilling and scoring operations on various materials would be examples of these applications. For materials other than biological tissue, different types of lasers producing wavelengths particularly suited for absorption may be required. Similarly, the marker system in any of the disclosed embodiments may be used with other types of low power visible wavelength lasers besides the preferred He-Ne laser.

The disclosed laser system in its various embodiments provides medical researchers with a new tool for performing surgery on biological tissues. The discoveries made through microscopic removal of tissue from the inner ear of animal subjects, for example, may lead to significant advances in medical science, especially in the area of psycho-acoustic research. The $CO_2$ laser operating in the lowest order spatial mode has been discovered to be an excellent source of highly focused energy for surgery. Holes in tissue can be made with pinpoint accuracy below 100 microns in diameter. The infrared beam from the $CO_2$ laser is so highly absorbed by biological tissue that only a portion of its energy need be used for surgery. However, since practically no visible light is available from the $CO_2$ laser, the auxiliary visible marker system is provided to indicate the location of the infrared focal point. By using a laser producing a coherent beam of light having a visible wavelength, the bright, focused marker spot is provided with approximately the same dimensions as the focused infrared spot. The two channel system of FIG. 3 provides the additional advantage of an attention-getting blinking marker system for indicating vertical inaccuracies of the operating site position with a precision formerly unavailable.

It will be understood that various changes in the details, materials, steps and arrangements of parts which have been herein described and illustrated in order to explain the nature of the invention, may be made by those skilled in the art within the principle and scope of the invention as expressed in the appended claims.

What is claimed is:

1. A laser system for applying an intense spot of radiant energy to a selected operating site, comprising first laser means for producing an operating beam of coherent colimated light, second laser means separated from said first laser means for producing a marker beam of visible coherent light, an optical means operatively aligned with said first and second laser means for focusing said operating and marker beams to a coincident focal point at the operating site, whereby the focused marker beam provides a visible spot of light to indicate the location of the coincident focal point of said operating beam.

2. The system of claim 1, wherein said first laser means produces an operating beam of invisible light.

3. The system of claim 2, wherein said first laser means produces said operating beam at an invisible infrared wavelength.

4. The system of claim 3, wherein said second laser means is a He-Ne laser.

5. The system of claim 3, wherein said first laser means is a $CO_2$ laser.

6. The system of claim 5, wherein said $CO_2$ laser operates in the lowest order $TEM_{00}$ spatial mode and said second laser means is a He-Ne laser.

7. The system of claim 2, wherein said optical means includes converging lens means operatively aligned with said first laser means for focusing said invisible operating beams and removable mirror means disposed obliquely in the path between said first laser means and said lens means, said second laser means being operatively oriented with respect to said mirror means such that said marker beam is reflected co-axially with the path of said operating beam toward said lens means.

8. The system of claim 7 further comprising power meter means, said mirror having two reflective sides, one of which is arranged to reflect said second laser source toward said lens means while the other side is arranged to reflect said first laser means operating beam toward said power meter means.

9. The system of claim 7 further comprising an optical viewing system operatively arranged to afford a magnified view of the operating site at which said marker and operating beams are focused, said optical means further including final mirror means for reflecting said marker and operating beams to the operating site.

10. The system of claim 9, wherein said final mirror means is totally reflective and is positioned out of the line of sight of said optical viewing system.

11. The system of claim 9, wherein said final mirror means includes a beam splitter for reflecting a co-axial portion of said marker and operating beams respectively toward said operating site, said optical viewing system being arranged to view the operating site through said beam splitter.

12. The system of claim 9, wherein said optical means further includes an auxiliary lens system operatively located between said removable mirror means and said second laser means.

13. The system of claim 1, wherein said optical means includes a first optical system optically aligned with said first laser means for directing and focusing said operating beam at an operating site and a second optical system optically aligned with said second laser means for directing and focusing said marker beam at the operating site independently of the operating beam.

14. The system of claim 13, wherein said second optical system includes means for dividing said marker beam to form a pair of marker beams and marker projector means optically aligned with said dividing means for focusing and directing said pair of marker beams from different directions respectively toward the focal point of said operating beam at the operating site such that the operating beam and pair of marker beams form three non-coaxial beams intersecting at their focal points respectively.

15. The system of claim 14, wherein said second optical system further comprises flasher means operatively located in the paths of said pair of marker beams for alternately blocking and passing the marker beams.

16. The system of claim 15, wherein said divider means comprises a beam splitter operatively arranged in the path of said marker beam from said second laser means for reflecting and transmitting equal portions of said marker beam, mirror means arranged to intercept the reflected portion of said marker beam from said beam splitter for deflecting said reflected portion parallel to the transmitted portion of said marker beam from said beam splitter.

17. The system of claim 15 further comprising a fiber optic light guide system interposed between said dividing means and said marker projector means for conveying said pair of marker beams thereto including a pair of lens means optically aligned respectively with said pair of marker beams for focusing said pair of marker beams to respective focal points, a pair of fiber optic light guides having respective one ends operatively positioned at the focal points of said pair of lens means, said pair of light guides having their opposite ends operatively connected to said marker projector means, said flasher means including a chopper disc mounted for rotation about a central axis and operatively located between the pair of lens means and the one ends of the pair of light guides, portions of said disc being removed such that one focused marker beam is passed to the corresponding light guide end while the other marker beam is blocked.

18. The system of claim 17, wherein said marker projector means includes a pair of converging optical systems optically aligned respectively with said opposite ends of said light guides.

19. The system of claim 18, further comprising said first optical system including beam splitter means optically aligned with said operating beam for deflecting a portion thereof toward said operating site, and optical viewing means arranged to afford a magnified view of the operating site through said beam splitter, said pair of marker projector optical systems including reflective means for directing said pair of marker beams through said beam splitter toward said operating site, said marker projector reflective means being located out of the line of site of said optical viewing means.

20. The system of claim 19, wherein said optical viewing means is a binocular stereo microscope having angularly separated stereo optical axis, the angular separation of the optical axes of said pair of marker beams at their point of incidence at the operating site being greater than the angular separation of said microscope stereo axes.

21. A laser system for locating the focal point of a laser beam at an operating site, comprising laser means for producing an operating beam, optical means aligned with said laser means for focusing said operating beam to a focal point at an operating site, and means separate from said laser means and said optical means for projecting from different points two focused marker beams of visible light converging at the focal point of said operating beam such that said operating beams and two marker beams form three non-coaxial light beams intersecting in a single point at their respective focal points, and optical viewing means for observing the operating site.

22. The system of claim 21, wherein said projecting means includes means for alternating said two marker beams, whereby two alternating spots appear through said optical viewing means when said operating site is not positioned at the focal point of said operating beam.

23. A laser system for performing microsurgery on biological tissues, comprising a $CO_2$ laser adapted to operate in the lowest order $TEM_{00}$ spatial mode for producing a coherent colimated infrared operating beam, a converging optical system optically aligned with said $CO_2$ laser for focusing and directing said operating beam toward an operating site to apply a microscopic spot of intense infrared energy thereto, and means for microscopically viewing the operating site.

24. The system of claim 23, wherein said converging optical system includes a beam splitter for directing a portion of said operating beam toward said operating site and a focusing lens system optically aligned between said beam splitter and said $CO_2$ laser, said viewing means positioned to observe the operating site through said beam splitter.

25. The system of claim 24, wherein said beam splitter is formed of a material for which the portion of incident visible light which is transmitted is greater than the portion of incident infrared light which is reflected.

26. The system of claim 23, further comprising laser control means for modulating the output of said laser to produce a predetermined number of discrete energy pulses forming said operating beam.

27. A method for performing microsurgery on biological tissues, comprising the steps of operating a $CO_2$ laser in the lowest order $TEM_{00}$ spatial mode to produce a microscopically focusable operating beam of infrared energy which is substantially completely absorbed by biological tissues, focusing said operating beam and directing the focal point of the focused operating beam to a target site of the biological tissue.

28. The method of claim 27, further comprising the step of visually locating the focal point of the infrared operating beam by generating a visible beam of light and focusing the visible beam to a point coincident with the focal point of the operating beam.

29. The method of claim 28 further comprising the step of generating another visible light beam and focusing it to a point coincident with the focal points of said one visible light beam and said operating beam such that the visible light beams at their point of incidence are non-coaxial.

30. The method of claim 29 further comprising the step of adjusting the position of the target site until the two spots of light from the visible light beams are coincident to indicate proper location of the focal point of the operating beam.

* * * * *